United States Patent [19]
Takahashi et al.

[11] 4,106,115
[45] Aug. 8, 1978

[54] MIXING APPARATUS

[75] Inventors: Akio Takahashi, Yokohama; Hirokichi Saito, Shimizu, both of Japan

[73] Assignee: Ihara Chemical Industry Co. Ltd., Tokyo, Japan

[21] Appl. No.: 770,933

[22] Filed: Feb. 22, 1977

[30] Foreign Application Priority Data

Feb. 20, 1976 [JP] Japan ................................. 51/16923
Aug. 5, 1976 [JP] Japan ................................. 51/92794

[51] Int. Cl.$^2$ ..................... B01F 15/02; B01F 15/04
[52] U.S. Cl. ................................. 366/138; 366/159; 366/161
[58] Field of Search ............. 259/4 R, 7, 8, 6, 5, 259/9, 10, 21–26, 43, 44, 64–67; 23/252 R, 253 A

[56] References Cited

U.S. PATENT DOCUMENTS

| | | |
|---|---|---|
| 2,847,196 | 8/1958 | Franklin ................................. 259/8 |
| 3,026,183 | 3/1962 | Cole ..................................... 259/7 |
| 3,067,987 | 12/1962 | Ballou ................................... 259/7 |
| 3,164,374 | 1/1965 | Ralph .................................... 259/8 |
| 3,203,675 | 8/1965 | Ward .................................... 259/7 |

Primary Examiner—Robert W. Jenkins
Attorney, Agent, or Firm—Tab T. Thein

[57] ABSTRACT

This invention relates to a material mixing apparatus for use, for example, in the preparation of polyurethane elastomers, wherein a mixer chamber, a set of switching valves and pipelines are maintained to ensure a constantly flowing state for the materials, the apparatus being featured in that it allows to remove the mixed materials in any amount at any time yet preventing contamination of the work site, as a result of a preferably totally closed structure. Two exemplary embodiments are disclosed, having at least two material tanks and switching means, as well as an additional switching means which can serve for a liquid rinsing agent or for a mixture of the materials.

6 Claims, 10 Drawing Figures

MIXING APPARATUS

Conventionally polyurethane elastomers have been prepared by feeding two or more liquid materials from respective containers into a mixer chamber through respective metering pumps, and continuously pouring the obtained mixture from the outlet of the mixer chamber into appropriate molds. Such conventional apparatus is very efficient if continuous molding is possible but it is to be noted that intermittent molding operations are quite frequently required depending upon the dimensions or the quantity of the molded products required.

In such intermittent operation, it becomes necessary to clean the mixer chamber with a solvent and to blow off deposits formed therein with an air flush at each interruption of the operation since such interruption induces a hardening of the materials in the mixer chamber.

Such a cleaning procedure, however, inevitably gives rise to a scattering of contaminating materials such as isocyanates, amines and solvents in the working site, and also to a considerable loss of materials as the air introduced into the mixer chamber at such procedure is inevitably included in the materials at the start of the succeeding mixing operation. Further, the considerable pressure variation appearing in the mixture chamber tends to result in an error in the measurement by the metering pumps, thus leading to a fluctuation in the composition of the materials.

Although there has been proposed, as an improvement on such conventional technology, an injection molding machine in which the obtained mixture is forcedly injected under an elevated pressure, such apparatus is still inadequate for the production of varied products in small quantities since the apparatus itself inevitably becomes larger and more complicated, and also since the metal molds are required to have a considerably higher resistance against pressure.

The present invention relates to a material mixing apparatus adapted for use in the preparation of polyurethane plastomers although it is not limited to such materials and can be used for mixing other starting materials as well.

The object of the present invention is to provide a material mixing apparatus of a simple structure which performs the mixing operation under atmospheric pressure and which enables to efficiently take out the mixed materials in a stable composition and in an arbitrary amount at any desired time.

Another object of the present invention is to provide an apparatus which is capable, through the use of a totally closed structure, of preventing contamination of the working site resulting from the scattering of materials or detergents.

A still other object of the present invention is to provide a material mixing apparatus wherein the mixer chamber, the switching valves, inclusive of all inlets and outlets thereof, and the pipelines, are constantly washed with a flowing detergent or liquid rinsing agent, thereby preventing the accumulation or deposition and hardening of the material even if it is thixotropic or reactive and hardenable.

Yet still another object of the present invention is to provide a material mixing apparatus capable of significantly reducing the amount of materials and energy required for the preparation of molded products, and thus of producing such molded products at an economically advantageous cost.

In addition to the foregoing, the material mixing apparatus of the present invention provides other advantages such as absence of abnormal pressure loads on the pumps due to the fact that all the fluids are constantly maintained in a stationary flowing state; possibility to directly combine the apparatus with production lines of automobiles or electric appliances; compatibility with centralized control systems, e.g. with a computer, enabling a completely automated operation due to the fact that all materials are maintained in stationary circulation; and absence of waste products and easiness of reutilization of recovered materials since any mixture of an unstable composition, formed in the beginning of the mixing operation, is completely recovered in a detergent tank.

The present invention is featured by a structure comprising plural reservoirs or tanks for the starting materials, plural material switching means respectively connected with the tanks through feed pumps, a mixer chamber connected with the material switching means, a detergent switching means connected with an outlet of the mixer chamber, and a tank for feeding a detergent through a feed pump to an inlet of the detergent switching means.

Preferably each switching means is composed of a valve body provided with five openings and a switching element capable of switchably maintaining two neighboring pairs of the openings (out of the total of five) in a mutually communicating relationship in each pair, while closing the remaining fifth opening, pipelines connecting all switching means with the detergent tank, pipelines respectively connecting the material switching means with the material tanks, and pipelines connecting the detergent switching means with the material switching means.

In a modified embodiment, the over-all set-up includes a mixture switching means (instead of the just described detergent switching means), the detergent being fed through the appropriate pump to respective inlets of the material switching means (instead of the inlet of the detergent switching means).

It will be understood from the foregoing that actually an additional switching means is provided in both exemplary embodiments, which can process either the liquid rinsing agent or a mixture of the materials being processed. The agent is being fed either to an inlet of the additional switching means or to respective inlets of the material switching means and of the additional switching means, as will be explained.

The modified arrangement, also including the valve body, the five openings and the switching element, is similar to that described earlier but there is no basic need for the above-described third group of pipeles, namely those connecting pipelines, additional or detergent switching means with the material switching means, as will be understood from the subsequent detailed description of the exemplary inventive apparatus embodiments.

Other objects, advantages and features of the present invention will become better understood by way of the following detailed description, when considered in conjunction with the accompanying drawings, wherein FIG. 1 is a schematic drawing showing the structure of a first, exemplary embodiment of the material mixing apparatus of the present invention;

Figure 1:
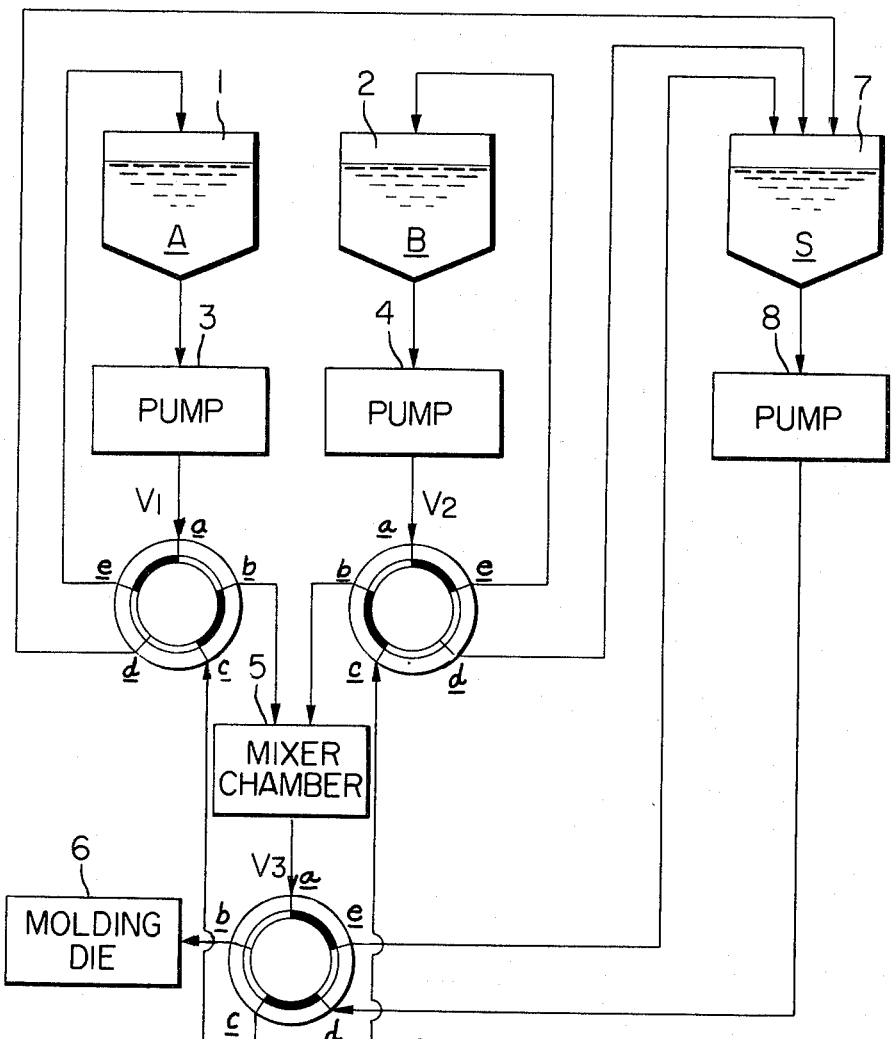

Now the present invention will be explained in detail with respect to the embodiments thereof, applied in the exemplary preparation of polyurethane elastomers, while referring first to FIG. 1. At 1 a reservoir tank is shown for a mixture of polytetramethylene ether glycol with 4,4'-diamino-2,3,2',3'-tetrachlorodiphenylmethane (hereinafter referred to as liquid A) and 2 is a reservoir tank for a mixture of 2,4-tolylene-diisocyanate (80%) and 2,6-tolylene-diisocyanate. (20%) (hereinafter referred to as liquid B), which are respectively connected, through metering pumps 3, 4 to inlets $a$ of material switching means or valves V1, V2 which serve to change the state of material feeding. The connections, likewise other connections which will hereinafter appear, are naturally achieved by suitable pipelines. Outlets $b$ of valves V1, V2 are connected to a mixer chamber 5 of which the outlet is connected to an inlet $a$ of a washing liquid switching means consisting of a switching valve V3 which serves to change the state of the washing liquid supply. It will be understood that washing liquid, liquid rinsing agent, detergent, and solvent are synonimous expressions used throughout this description.

Outlet nozzle $b$ of valve V3 is connected to a chamber receiving the obtained mixture, for example a molding die 6. A solvent S, for example polypropylene glycol, which serves as a detergent, is stored in a reservoir tank 7 connected through a metering pump 8 to an inlet $d$ of valve V3, of which an outlet $c$ is connected through other inlets $c$ of valves V1, V2. Also outlets $d$ of valves V1 to V3 are connected to detergents tank 7, and outlets $e$ of valves V1, V2 are respectively connected to tanks 1, 2.

Figure 2:
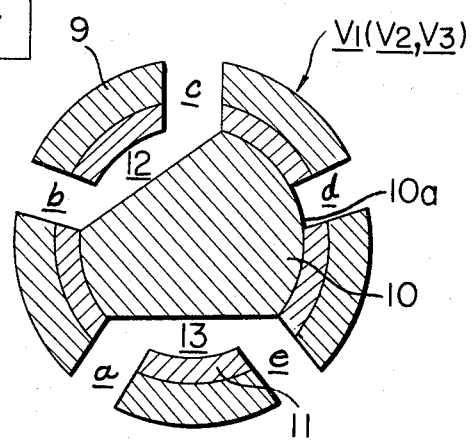
FIG. 2 is a cross-sectional view of a switching means.

Reference is now made to FIG. 2 with respect to the structure of valves V1 . . . V3. Each valve consists of a tubular valve body 9 provided with five openings $a$ to $e$ (including the abovementioned inlets and outlets) which are arranged with substantially the same angular positions and distances therebetween, and a switching valve rod 10 constituting a switching element which is rotatably supported in the internal space of valve body 9.

The latter is further provided, along the internal periphery thereof, with a tubular sheet 11 made of tetrafluoroethylene, for example "Teflon" (trademark) and provided with openings in the positions corresponding to those of openings $a$ to $e$ in valve body 9, and the valve rod is in rotatable frictional contact at the external periphery thereof with the internal periphery of the sheet 11.

Valve rod 10 is so structured as to have two grooves 12, 13 of a width substantially equal to that of openings $a$ to $e$ of valve body 9, and of a length sufficient for maintaining four neighboring openings out of the five openings in two pairs of mutually communicating relationship ($a$ and $e$, $b$ and $c$ in the case of FIG. 2), while an arcuate portion 10$a$ located outside of grooves 12, 13 on valve rod 10 is adapted to close and isolate the remaining fifth opening ($d$ in the case of FIG. 2) from other openings. Sheet 11, although being not always indispensable, serves to facilitate the switching operation of the valve rod 10 by means of the releasing effect of the used material, particularly in the case of passing viscous materials.

Figure 3:
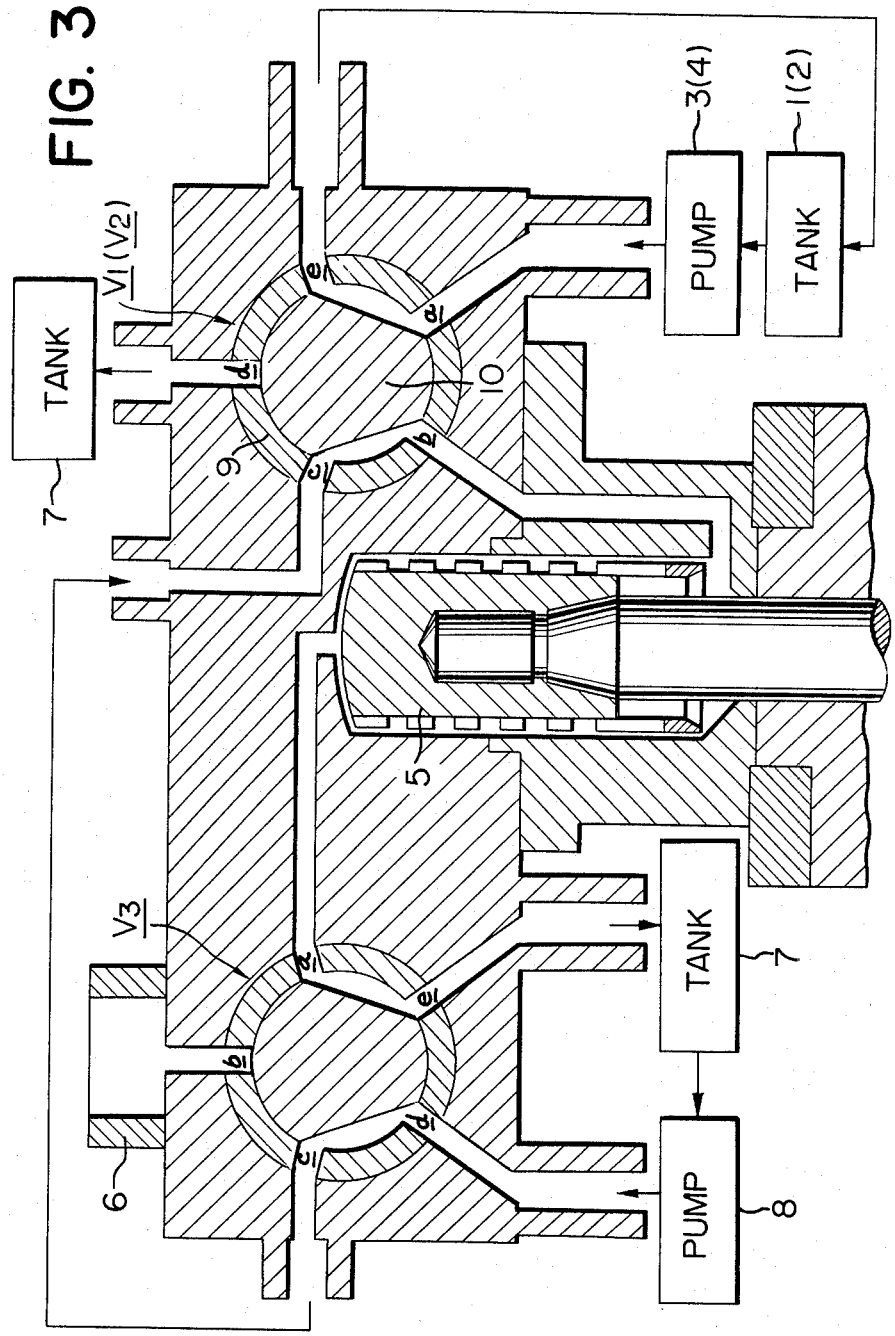
FIG. 3 is a cross-sectional view of the principal part of the present invention.

Now an explanation will be given on the function of the apparatus of the present invention, while referring again to FIG. 1. In a first stage, prior to the start of mixing of materials A, B, switching valves V1, V2 are placed in the position illustrated in FIG. 3 so as to establish a communicating relationship between openings $a$, $e$ and $b$, $c$, while valve V3 is in the position to establish communicating relationship between openings $a$, $e$ and $c$, $d$. As a result, materials A, B are respectively circulated in closed circuits, passing through pumps 3, 4 and openings $a$, $e$ of valves V1, V2, and returning to tanks 1, 2, while detergent S is also circulated in a closed circuit, passing through pump 8, openings $d$, $c$ of valve V3, then openings $c$, $b$ of valve V1 or V2, mixer chamber 5, further openings $a$, $e$ of valve V3, and returning to tank 7.

In a second stage, where the mixing of materials A, B is commenced, switching valves VI, V2 are changed to the position wherein communication is made between openings $a$, $b$ and $c$, $d$. As a result materials A, B are supplied through openings $a$, $b$ of valves V1, V2 to chamber 5 in which the materials are mixed, though resulting in an unstable mixing, as the mixer chamber is initially filled with detergent S, and finally to tank 7 through openings $a$, $e$ of valve V3. On the other hand, detergent S is circulated through openings $d$, $c$ of valve V3, and then openings $c$, $d$ of valves V1, V2, and returned to tank 7.

Figure 4:
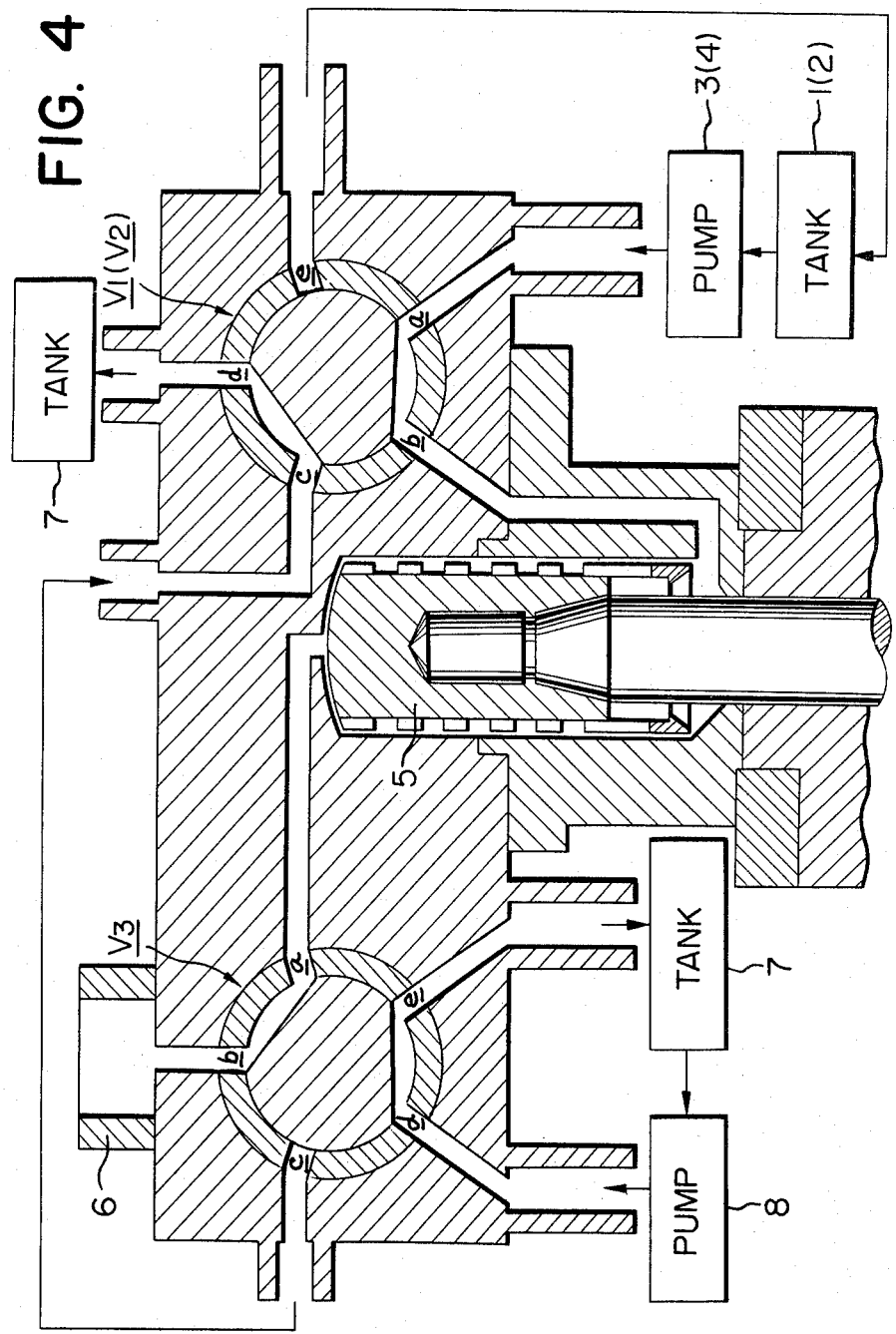
FIG. 4 is a similar cross-sectional view illustrating the function of the apparatus of the present invention.

As soon as the mixing of materials A, B becomes stabilized, the molding operation is initiated by switching valve V3 alone to the position illustrated in FIG. 4 wherein communication is made between openings $a$, $b$ and $d$, $e$ of that valve. As a result the mixture present in chamber 5 is supplied through openings $a$, $b$ of valve V3 to molding die 6, and eventually molded therein. In this state detergent S is circulated through openings $d$, $e$ of switching valve V3 to tank 7.

In a third stage, where a batch of mixing of materials A, B is approaching its end, valve V3 is switched to a position wherein communication is made between openings $a$, $e$ and $c$, $d$ thereof. In this state, therefore, the mixture of materials A, B is discharged through openings $a$, $e$ of valve V3 to tank 7, while detergent S is circulated through openings $d$, $c$ of valve V3 and openings $c$, $d$ of valves V1, V2, and returned to tank 7.

Successively valves V1, V2 are switched to the position wherein communication is made between openings $a$, $e$ and $b$, $c$, thereby allowing materials A, B to circulate in respective closed circuits, passing through openings $a$, $e$ of valves V1, V2, and returning to tanks 1, 2, and also allowing detergent S to circulate in a closed circuit, passing through openings $d$, $c$ of valve V3, openings $c$, $b$ of valves V1, V2, chamber 5 and openings $a$, $e$ of valve V3, and returning to tank 7. The abovementioned switching operation of valves V1, V2 in this third stage can naturally be carried out simultaneously with the switching operation of valve V3.

In this manner the state of the first stage is reached upon completion of the operations in the third stage. Thus the above-explained stages can be repeated after suitably and respectively replenishing tanks 1, 2 with materials A, B.

Figure 5:
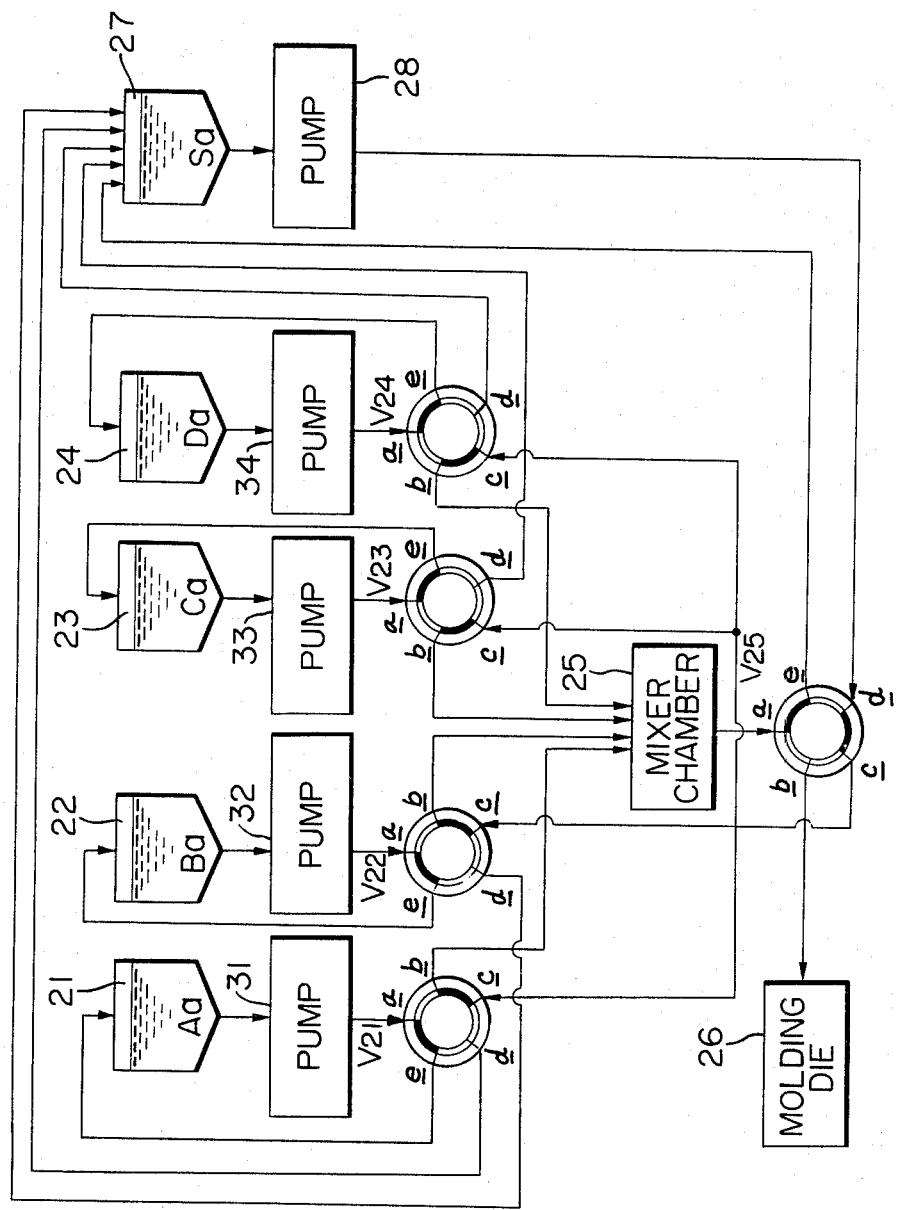
FIG. 5 is a schematic drawing showing the composition of another embodiment.

In the following there will be given an explanation on another embodiment of the present invention, illustrated in FIG. 5, adapted for mixing four liquidous materials Aa, Ba, Ca and Da, wherein switching valves V21 ... V25 are of a structure substantially identical to that of the afore-mentioned switching valves V1 ... V3. The materials are respectively stored in tanks 21 ... 24 which are respectively connected, through metering pumps 31 ... 34, to inlets a of material switching valves V21 ... V24, of which outlets b are connected to a mixer chamber 25, of which the outlet is in turn connected to an outlet a of a washing-liquid switching valve V25.

Outlet nozzle b of switching valve V25 is connected to a chamber receiving the obtained mixture, for example a molding die 26. On the other hand, a detergent sa is stored in a tank 27 which is connected through a metering pump 28 to an inlet d of valve V25 of which an outlet c is connected, through a manifold pipe, to inlets c of valves V21 ... V24. Further, outlets d of these valves are connected to detergent tank 27, while outlets e thereof are respectively connected to tanks 21 ... 24.

Now the function of the apparatus of this embodiment will be explained. In the initial, stationary state material switching valves V21 ... V24 are placed in the position wherein communication is established between openings a, e and b, c in each valve, while detergent switching valve V25 is placed in the position wherein communication is established between openings a, e and c, d. Consequently materials Aa ... Da are circulated in respective closed circuits passing through pumps 31 ... 34, and openings a, e of valves V21 ... V24, returning to tanks 21 ... 24, while detergent Sa is circulated in a closed circuit, passing through pump 28, openings d, c of valve V25, then openings c, b of valves V21 ... V24, chamber 25 and openings a, e of valve V25, returning to tank 27.

In order to initiate mixing of the materials, valves V21 ... V24 are switched to the position wherein communication is established between openings a, b and c, d, whereby the materials are supplied to openings a, b of respective valves V21 ... V24 to mixer chamber 25, to be subjected to mixing therein, which however is conducted in an unstable state due to the fact that chamber 25 is initially filled with detergent Sa, and further to tank 27. In this state the detergent is circulated through openings d, c of valve V25 and openings c, d of valves V21 ... V24, and returned to tank 27. As soon as the mixing of the materials becomes stabilized, valve V25 is switched to a position wherein communication is established between openings a, b and d, e, whereby the mixture present in chamber 25 is discharged through openings a, b of valve V25 to die 26, and the detergent is circulated through openings d, e of valve V25, and returned to tank 27.

When a batch of mixing of the materials approaches its end, valves V21 ... V24 are shifted to the position wherein communication is made between openings a, e and b, c therein, and valve V25 is shifted to the position wherein communication is made between openings a, e and c, d to restore the initial state.

Figure 6:
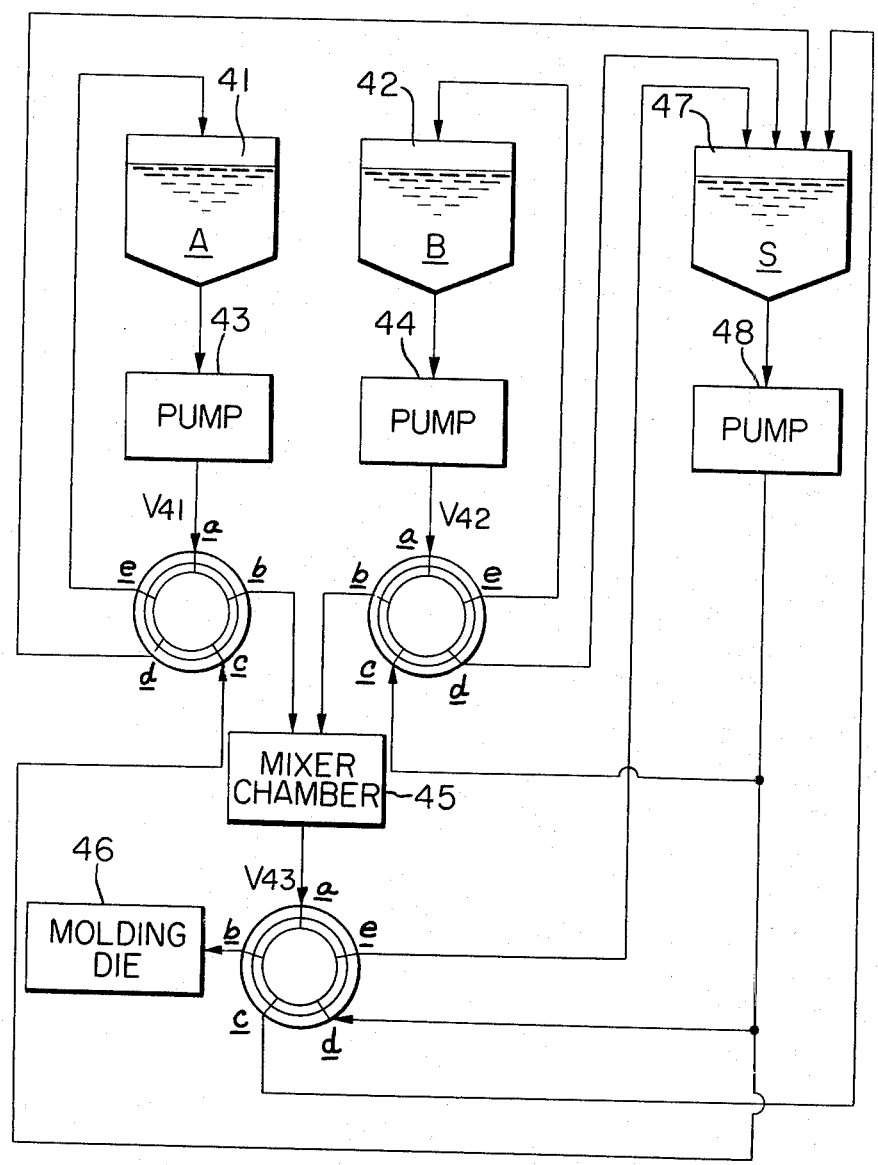
FIG. 6 is a similar drawing showing the structure of a still other embodiment.
Figure 7:
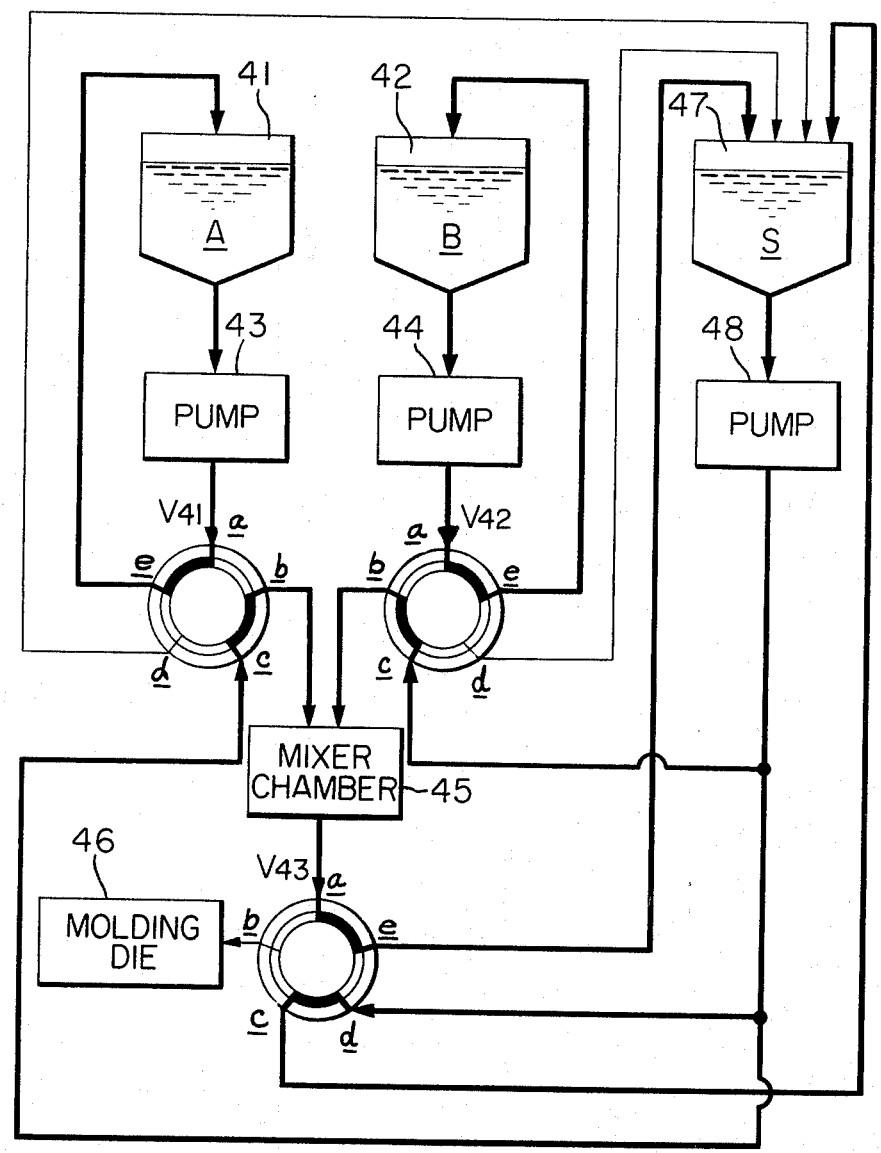
FIGS. 7 to 10 are similar schematic drawings illustrating the function of the embodiment shown in FIG. 6.

In the following there is given an explanation of still another embodiment of the present invention, illustrated in FIGS. 6 to 10. Referring to FIG. 6, 41 and 42 are respective reservoirs for the afore-mentioned material A, B, which are respectively connected, by means of pipelines and through metering pumps 43, 44, to inlets a of material switching means or valves V41, V42 of a structure identical with that of the afore-mentioned valves V1 ... V3, and serving to control the supply of materials. Outlets b of valves V41, V42 are connected to a mixer chamber 45 of which the outlet is connected to an inlet a of switching valve V43, serving as a mixed switching means for controlling the supply of the detergent. Valve V43 is structured identically with the afore-mentioned valves V41, V42.

Further, an outlet nozzle b of valve V43 is connected to a chamber receiving the completed mixture, for example a molding die 46. On the other hand, the solvent S serving as a detergent is stored in a tank 47 which is connected through a metering pump 48 to inlets c of valves V41, V42 and also to inlet d of valve V43, of which latter outlets c, e lead to detergent tank 47. Furthermore, outlets d of valves V41, V42 also lead to tank 47, and outlets e thereof are respectively connected to tanks 41, 42.

The function of this embodiment is explained in the following. In the initial, first stage, prior to the start of the mixing of materials A, B, valves V41, V42 are placed in the position illustrated in FIG. 7 wherein the communicating relationship is established between openings a, e and b, c while valve V43 is positioned as illustrated therein to establish a communication between openings a, e and c, d, whereby the materials are circulated in respective closed circuits passing through pumps 43, 44, openings a, e of valves V41, V42, and returning to respective tanks 41, 42, while the detergent is circulated by pump 48 in a closed circuit passing through openings d, c of valve V43, and returning to tank 47 or another circuit passing through openings c, b of valves V41, V42, chamber 45 and openings a, e of valve V43, and returning to tank 47.

Figure 8:
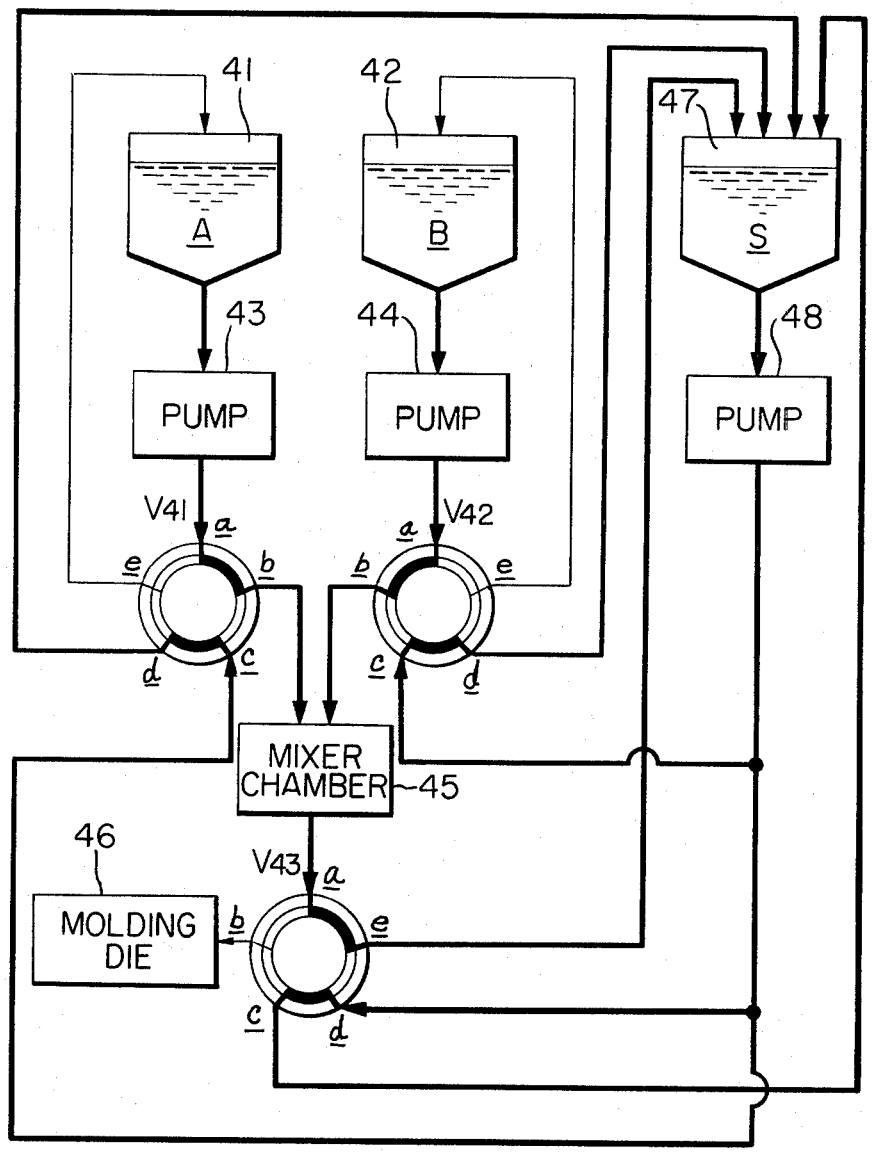

In the second stage valve V41 is switched to the position illustrated in FIG. 8 wherein communication is made between openings a, b and c, d, thereby initiating the mixing of materials A, B. In this state the materials are supplied through openings a, b of valves V41, V42 to chamber 45 and subjected to mixing therein, which however is conducted in an unstable condition due to the fact that chamber 45 is initially filled with detergent S, and finally discharged through openings a, e of valve V43 to tank 47. At the same time the detergent is circulated through openings d, c of valve V43 or through openings c, d of valves V41, V42, and returned to tank 47.

Figure 9:
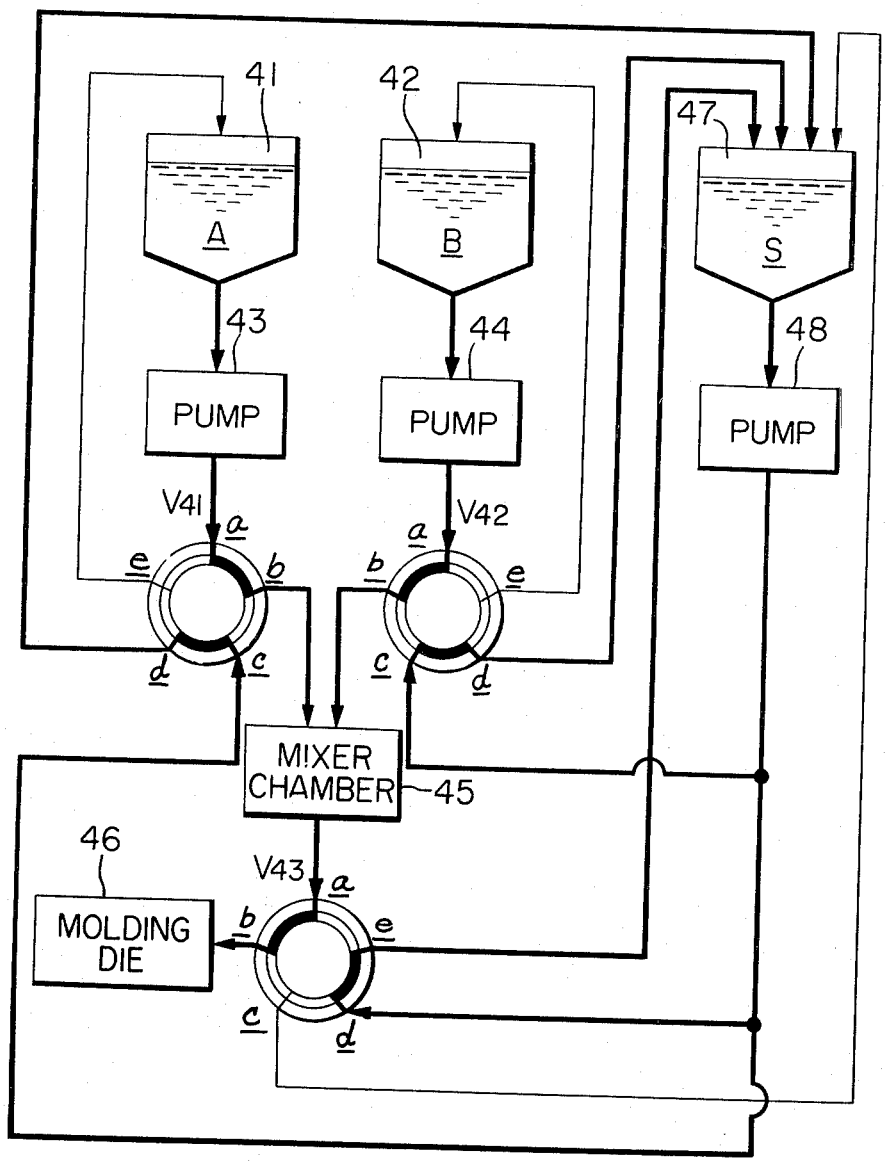

As soon as the mixing of the materials becomes stabilized, the molding operation is initiated by switching valve V43 to the position illustrated in FIG. 9 wherein communication is made between openings a, b and d, e, whereby the mixture present in chamber 45 is supplied through openings a, b of valve V43 to die 46 to perform the molding operation therein, while the detergent is circulated through openings d, e of valve V43 to detergent tank 47 together with the remaining mixture of the materials, and also through openings c, d of valves V41, V42 to tank 47.

Figure 10:
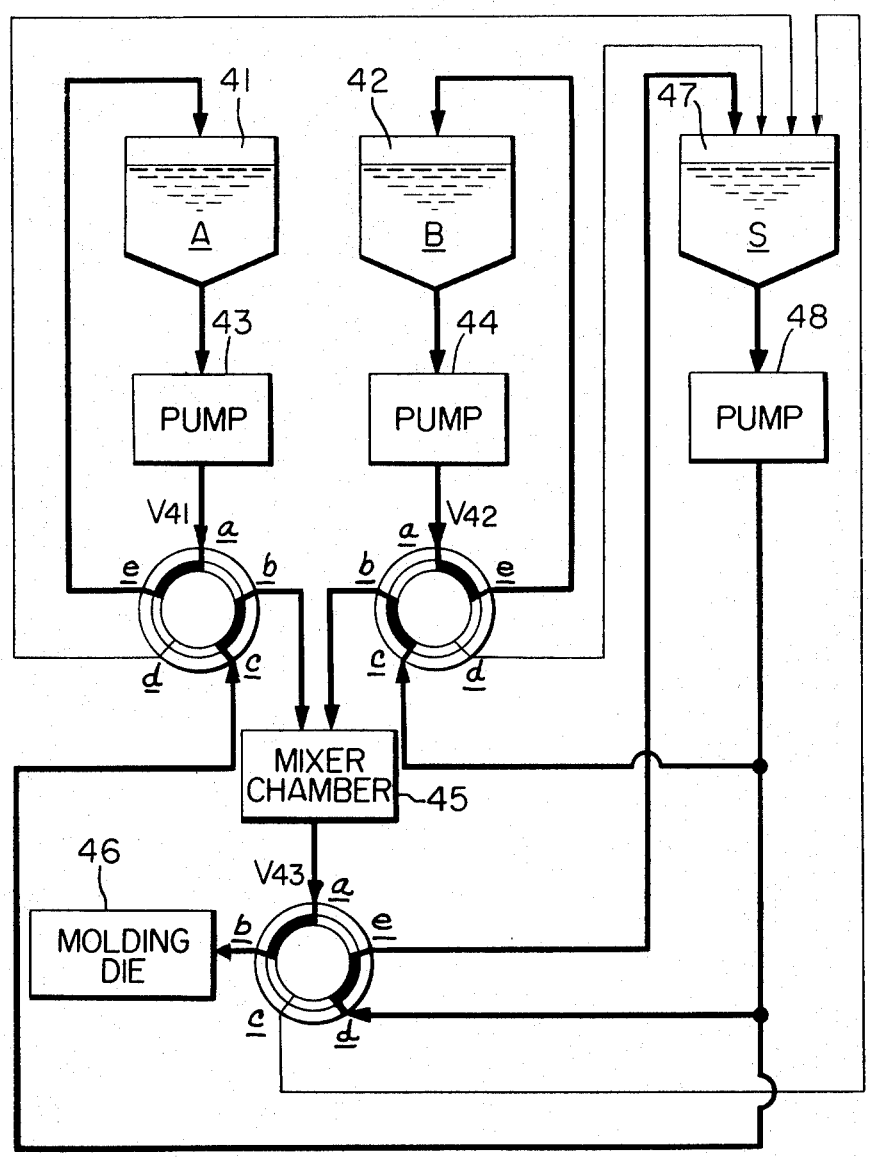

In the third stage, where a batch of mixing the materials approaches its end, valves V41, V42 are switched to the position illustrated in FIG. 10 wherein communication is established between openings a, e and b, c. In this state materials A, B are circulated in respective closed circuits passing through openings a, e of valves V41, V42, and returning to respective tanks 41, 42, while the detergent is circulated in a circuit passing through openings d, e of valve V43, and returning to tank 47.

Simultaneously detergent S flows through openings c, b of valves V41, V42, chamber 45, then openings a, b of valve V43 and molding die 46 to clean outlet b. Successively valve V43 is switched to the position wherein communication is established between openings a, e and c, d, thereby restoring the initial state illustrated in FIG. 7. In this manner the above-mentioned procedure can be repeated after properly replenishing tanks 41, 42 with materials A, B.

It will be understood by those skilled in the art that modifications, additions, changes, substitutions and the like can be made in the described, exemplary embodiments, within the known concept of mechanical and operational equivalents, without departing from the spirit and scope of the present invention.

What we claim is:

1. A material mixing apparatus comprising at least two tanks (1, 2; 41, 42) for starting materials, a corresponding number of material switching means (V1, V2; V41, V42) respectively connected with said tanks through pumps (3, 4; 43, 44), a mixer chamber (5; 45) connected to outlets (b) of said switching means, additional switching means (V3; V43) connected to an outlet of said mixer chamber, and a tank (7; 47) for feeding a liquid rinsing agent through a pump (8; 48) to an inlet of at least one (V3, F43) of said switching means; wherein said switching and said additional switching means each include a valve body (9) provided with five openings (a ... e) and a switching element (10) for switchably maintaining two neighboring pairs of said openings in a mutually communicating relationship in each pair, while closing the remaining fifth opening.

2. The material mixing apparatus as defined in claim 1, wherein said switching means (VI ... V3, V41 ... V43) and said mixer chamber (5, 45) have totally closed structures.

3. The material mixing apparatus as defined in claim 1, wherein said openings (a ... e) include an arrangement of three outlet (at least b and e) and two inlets (at least a), one of said outlets serving as a common outlet for said two inlets.

4. The material mixing apparatus as defined in claim 1, further comprising pipelines connecting said switching means (V1 ... V3, V41 ... V43) with said rinsing-agent tank (7, 47), and pipelines respectively connecting said material switching means (V1, V2; V41, V42) with said material tanks (1, 2; 41, 42).

5. A material mixing apparatus comprising at least two tanks (1, 2) for starting materials, a corresponding number of material switching means (V1, V2) respectively connected with said tanks through pumps (3, 4), a mixer chamber (5) connected to outlets (b) of said switching means, additional switching means (V3) connected to an outlet of said mixer chamber, and a tank (7) for feeding a liquid rinsing agent through a pump (8) to an inlet of at least one (V3) of said switching means; further comprising pipelines connecting said switching and said additional switching means with said rinsing-agent tank, and pipelines respectively connecting said material switching means with said material tanks; wherein said additional switchingmeans is for the liquid rinsing agent, and the latter is fed from said pump to an inlet (d) of said additional switching means; and also comprising pipelines connecting an outlet (c) of said additional switching means with respective inlets (d) of said material switching means.

6. A material mixing apparatus comprising at least two tanks (41, 42) for starting materials, a corresponding number of material switching means (V41, V42) respectively connected with said tanks through pumps (43, 44), a mixer chamber (45) connected to outlets (b) of said switching means, additional switching means (V43) connected to an outlet of said mixer chamber, and a tank (47) for feeding a liluid rinsing agent through a pump (48) to an inlet of at least one (V43) of said switching means; further comprising pipelines connecting said switching and said additional switching means with said rinsing-agent tank, and pipelines respectively connecting said material switching means with said material tanks; wherein said additional switching means is for a mixture of the materials; and also comprising pipelines for feeding the rinsing agent from said pump to respective inlets of said material switching means and said additional switching means.

* * * * *